United States Patent Office 3,707,513
Patented Dec. 26, 1972

3,707,513
METHOD FOR PREPARING ALKYLENE OXIDE POLYMERS
Katsuji Ueno and Takao Oshima, Osaka, Japan, assignors to Sumitomo Chemical Co., Ltd., Osaka, Japan
No Drawing. Filed Aug. 5, 1970, Ser. No. 61,507
Claims priority, application Japan, Aug. 5, 1969, 44/62,148
Int. Cl. C08g 23/14
U.S. Cl. 260—2 A                   9 Claims

ABSTRACT OF THE DISCLOSURE

A mono-oxirame compound polymer or copolymer is prepared by polymerizing at least one mono-oxirane compound in the presence of a ternary catalyst system comprising an organo-aluminum compound, orthophosphoric acid, and a compound represented by the general formula $M(NR_2')_3$ wherein M is phosphorus, arsenic or antimony, and R' is a hydrocarbon radical.

BACKGROUND OF THE INVENTION

Field of the invention

The present invention relates to a method for preparing mono-oxirane compound polymers or copolymers which comprises polymerizing at least one mono-oxirane compound in the presence of a ternary catalyst system.

Description of the prior art

Polymers of mono-oxirane compounds have been used in a variety of ways; for example, polymers of epichlorohydrin, copolymers of epichlorohydrin with ethylene oxide and copolymers of propylene oxide with allyl glycidyl ether have been used as synthetic rubbers; and polymers of ethylene oxide are useful as water-soluble high molecular weight compounds. These polymers of mono-oxirane compounds have more of a commercial value as the molecular weight of the polymers becomes greater. When they are used as synthetic rubbers, they must have sufficient non-crystallinity. In order to produce mono-oxirane compound polymers having such properties at the same time, a polymerization catalyst usable to polymerize industrial mono-oxirane compounds must possess certain requisite characteristics.

A number of catalyst systems for polymerizing mono-oxirane compounds have hitherto been proposed. For example, organo-aluminum-water type catalysts, organo-zinc-water type catalysts, organo-aluminum-water-acetyl aceton type catalysts, a reaction product of zinc acetate and aluminum alkoxide, organo-aluminum-phosphoric acid type catalysts, etc., have been proposed.

In general, the use of an organo-aluminum compound alone as the catalyst for the polymerization, for instance, of epichlorohydrin, does not cause polymerization. Japanese patent publication No. 5,444/63 has disclosed that the use of an organo-aluminum-phosphoric acid type catalyst, for the polymerization of epichlorohydrin as an example, only produces a polymer having a low degree of polymerization and also having a crystallinity as high as 10 and several percent thereof is insufficient for use as rubbery materials. Moreover, when this catalyst is used, the polymerization rate is too low. Thus, it is less attractive in industrial application. The use of a binary catalyst system comprising an organo-aluminum compound and $M(NR_2')_3$ exhibits comparatively greater polymerization activity but it is still insufficient from an industrial point of view. In this case, the polymer obtained has a non-crystalline structure but it is almost useless in industry because of its very low molecular weight.

The primary object of the present invention is to provide a method for preparing industrial mono-oxirane compound polymers in an advantageous manner.

SUMMARY OF THE INVENTION

The present inventors have now found that the use of a ternary catalyst system comprising an organo-aluminum compound, orthophosphoric acid and a compound having the general formula $M(NR_2')_3$ is effective for preparing high molecular weight mono-oxirane compound polymers at a very high reaction rate with markedly increased intrinsic yield of the polymers per unit of catalyst, and that completely noncrystalline polymers can be obtained when applying the above catalyst to the polymerization of epichlorohydrin.

DETAILED DESCRIPTION OF THE PREFERRED EMBODIMENTS

The present invention is based on the above discovery and relates to a method for preparing mono-oxirane compound polymers or copolymers, which comprises polymerizing at least one mono-oxirane compound in the presence of a ternary catalyst system comprising an organo-aluminum compound represented by the general formula $AlR_{3-n}X_n$ (wherein R is a single hydrocarbon or mixtures thereof, n is an integer of 0–1 and X is a member selected from the group consisting of halogen and alkoxide groups), orthophosphoric acid and a compound represented by the general formula $M(NR_2')_3$ (wherein M is a member selected from the group consisting of phosphorus, arsenic and antimony, and R' is a hydrocarbon radical).

Representative examples of the organo-aluminum compound having the above formula are as follows: triethyl aluminum, tri-n-propyl aluminum, tri-n-butyl aluminum, triisobutyl aluminum, tri-n-hexyl aluminum, triisohexyl aluminum diethyl, isobutyl aluminum, tricyclohexyl aluminum, triphenyl aluminum, diisobutyl aluminum monochloride, monoethyl monoisobutyl aluminum monochloride, diisopropyl aluminum monoisopropoxide and mixtures theref. Among these, organoaluminum compounds having at least 3 carbon atoms in the hydrocarbon radical are especially suited for the polymerization of epichlorohydrin.

The orthophosphoric acid to be used in the present invention contains the structure $P(O)(OH)_3$ as its main component. This is obtained, for example, by thermally dehydrating commercial aqueous phosphoric acid solution at a temperature below 250° C. under atmospheric or reduced pressure.

There is used in the present invention the compound of the general formula $M(NR_2)_3$ wherein M is member selected from the group consisting of phosphorus, arsenic and antimony and R' is a hydrocarbon radical such as alkyl, cycloalkyl, aryl and aralkyl. Typical hydrocarbon radicals are, for example, methyl, ethyl, propyl, butyl, hexyl, cyclohexyl, cyclopentadienyl, phenyl, naphthyl and tolyl; and representative examples of the compound to be used in the present invention include: tris-(diethylamino) phosphine, tris(di-n-propylamino) phosphine, tris(di-n-butylamino) phosphine, tris(di-n-hexylamino) phosphine, tris(diethylamino) arsine, and tris-(diethylamino) stilbene.

In carrying out the method of the present invention, the ratio of the organo-aluminum compound to the orthophosphoric acid and the compound of the general formula $M(NR_2')_3$ is selected within such a range that the orthophosphoric acid is present in an amount of 0.01 to 2 moles, preferably 0.1 to 1 mole per mole of the organo-aluminum compound, and the compound of the formula $M(NR_2')_3$ is present in an amount of 0.01 to 0.5 mole, preferably 0.05 to 0.3 mole per mole of the organo-aluminum compound.

In preparing the ternary catalyst system of the present invention, it is preferred to mix the three components in an inert solvent. However, they may be mixed simply in any known manner.

The inert solvent to be used in the preparation of the catalyst typically includes hydrocarbons (e.g., benzene, toluene, xylene, ethyl benzene, n-pentane, isopentane, n-hexane, 3-methyl pentane, n-heptane, n-octane, cyclohexane, and Decalin); ethers (e.g., diethyl ether, di-n-propyl ether, di-n-butyl ether, diisobutyl ether, anisol, diphenyl ether, tetrahydrofuran, 1,4-dioxane, and 1,3-dioxane); halogenated hydrocarbons (e.g., chlorobenzene, methyl chloride, methylene chloride, chloroform, carbon tetrachloride, and ethylene dichloride); and mixture of two or more of these solvents.

The catalyst of the present invention can be prepared at any desired temperature. For instance, the preparation can be carried out at a temperature as low as $-80°$ C. or as high as about $150°$ C. under atmospheric pressure. The catalyst may be prepared under increased or reduced pressure, if desired.

The catalyst may be prepared by intermixing all three components at once before starting the polymerization, but two components may be added prior to the initiation of the polymerization, and then the remaining third component may be added to a mixture of any two components after the initiation of the polymerization. It is also possible to prepare the catalyst in the polymerization system by adding any one or two components or even all three components to thereby start the polymerization and by adding the remaining components to the system successively, thereafter continuing the polymerization.

In this case, it is convenient to firstly react the organo-aluminum compound with the orthophosphoric acid then add to the product the compound of the formula $M(NR_2')_3$ and this often gives good results.

The proportion of catalyst in the reaction system in carrying out the method of the present invention is usually determined so that the organo-aluminum compound is present within the range of 0.01 to 10 mole percent, preferably 0.2 to 5 mole percent based on the alkylene oxides.

The polymerization is carried out at a temperature within the range of from $-78°$ to $200°$ C., preferably from $-30°$ to $120°$ C.

The pressure under which the polymerization is carried out is not critical. The polymerization is usually conducted under atmospheric pressure, but the polymerization may be carried out under increased or reduced pressure.

The polymerization may be carried out under a variety of conditions and may be operated as a batch or continuous operation according to a variety of practical embodiments wherein the catalysts are added at the same time or intermittently, or successively, during the polymerization. It is also possible, if desried, to gradually add the monomer to the reaction system. The polymerization may be carried out in a bulk polymerization method, and in some instances, it is carried out at the boiling point of the monomer in order to remove the heat of the reaction. The polymerization is generally conducted in an inert solvent so as to facilitate the operation. Any type of solvent which remains inert under the polymerization conditions may be used as the inert solvent. Examples of such solvents are hydrocarbons (e.g., benzene, toluene, n-hexane, n-heptane, cyclohexane and Decalin); ethers (e.g., diethyl ether, di-n-propyl ether, tetrahydrofuran and dioxane); halogenated hydrocarbons (e.g., chlorobenzene and methylene chloride); and mixtures of any two or more of the above solvents.

In the method of the present invention, any compound containing an oxirane group can generally be polymerized or copolymerized. Representative examples of these compounds include: ethylene oxide, propylene oxide, 1,2-epoxybutane, 2,3-epoxybutane, epichlorohydrin, epibromohydrin, cyclohexene oxide, allyl glycidyl ether, phenyl glycidyl ether, butadiene monoxide, styrene oxide and mixtures thereof.

The catalyst to be used in the present invention has the following advantages:

(1) It gives a greater polymer conversion degree and polymerization rate compared with hitherto known catalysts.

(2) It can provide high molecular weight polymers without lowering the rate of polymerization, and control of the molecular weight is possible.

(3) It can be preserved in a stable state for a long period of time as long as it is kept free from exposure to water and air.

(4) It gives a completely amorphous polymer when applied to the polymerization of epichlorohydrin.

The method of the present invention is further explained according to the following examples which are merely illustrative and not limiting in nature.

EXAMPLE 1

A three-necked flask fitted with a stirrer, a thermometer and a dropping funnel was charged with 10 ml. of sufficiently dehydrated diethyl ether and 5 millimoles of orthophosphoric acid obtained by heating a commercial 85% aqueous phosphoric acid solution at $100°$ C. for 10 hours under a reduced pressure of 1 mm. Hg. 10 millimoles of triisobutyl aluminum diluted with 20 ml. toluene was added thereto dropwise, under a nitrogen atmosphere with stirring at $0°$ C. over a period of 10 minutes. After raising to room temperature, the resulting solution was used as the catalyst solution.

The atmosphere in a hard test-tube having an inner diameter of 18 mm. and a length of 100 mm. was replaced by nitrogen, then charged with 12 ml. toluene, 9.13 $\mu$l. of tris(diethylamino)phosphine (0.0333 millimole) and 1 ml. of the above catalyst solution (this corresponded to 0.333 millimole of triisobutyl aluminum and 0.167 millimole of orthophosphoric acid) under nitrogen atmosphere, and cooled by Dry Ice. 4 ml. of epichlorohydrin was charged thereto and the tube was sealed. The polymerization was carried out in a thermostat at $50°$ C. for the period of 2 hours. After the completion of the polymerization, the sealed tube was cooled and opened to take out the polymer. The polymer was then evaporated to dryness and dried in a vacuum at $60°$ C. for 18 hours. The yield and the viscosity of the resultant polymer are shown in Table 1 in comparison with the results obtained in the absence of tris(diethylamino)phosphine or orthophosphoric acid.

TABLE 1

| No. | Catalyst (millimole) | | | Yield (percent) | Viscosity [1] ($\eta$ sp./c.) | Crystallinity [2] |
|---|---|---|---|---|---|---|
| | Al(i-Bu)$_3$ | H$_3$PO$_4$ | P(NEt$_2$)$_3$ | | | |
| 1 | 0.333 | 0.167 | 0.0333 | 100 | 4.78 | Not at all. |
| 2 (comparison) | 0.333 | 0.167 | 0 | 46 | 1.70 | 10 and several percent. |
| 3 (comparison) | 0.333 | 0 | 0.0333 | 2.6 | | Not at all. |

[1] The viscosity ($\eta$ sp./c.) was measured in cyclohexanone at the concentration of 0.1 g./100 ml. at $50°$ C.
[2] The crystallinity was determined by X-ray diffraction analysis.

As is apparent from Table 1, the use of tris(diethylamino)phosphine greatly improved the polymer yield and the molecular weight of the resultant polymer. In addition, the polymer thus obtained was completely amorphous.

EXAMPLE 2

Polymerization of epichlorohydrin was carried out according to the procedure of Example 1 with varying ratios of triisobutyl aluminum to orthophosphoric acid at a constant concentration of tris(n-butylamino) phosphine. The results in comparison to the use of no phosphoric acid are shown in Table 2.

TABLE 2

| No. | Catalyst (millimole) | | | Yield (percent) | Viscosity [1] ($\eta$ sp./c.) |
|---|---|---|---|---|---|
| | Al(i-Bu)$_3$ | H$_3$PO$_4$ | P(N(n-Bu)$_2$)$_3$ | | |
| 1 | 0.333 | 0.084 | 0.0333 | 100 | 9.73 |
| 2 | 0.333 | 0.167 | 0.0333 | 100 | 6.65 |
| 3 | 0.333 | 0.250 | 0.0333 | 99 | 3.30 |
| 4 [2] | 0.333 | 0 | 0.0333 | 4.3 | |

[1] The viscosity was measured in the same manner as in Example 1.
[2] Comparison.

As is apparent from Table 2, a high molecular weight polymer was also obtained at a remarkably increased yield when using tris(di-n-butylamino)phosphine. Moreover, the polymer thus obtained was completely amorphous. It will also be noted from Table 2 that control of the molecular weight is possible, without causing any decrease in the polymer yield, by changing the ratio of triisobutyl aluminum to orthophosphoric acid.

EXAMPLE 3

Polymerization of epichlorohydrin was carried out according to the procedure of Example 1 except that tri-n-propyl aluminum, tri-n-butyl aluminum or tri-n-hexyl aluminum was used instead of triisobutyl aluminum, and tris(di-n-butylamino)phosphine was used instead of tris(diethylamino)phosphine.

The results are shown in Table 3 in combination with comparative experiments.

TABLE 3

| No. | Catalyst (millimole) | | | Yield (percent) | Viscosity [1] ($\eta$ sp./c.) |
|---|---|---|---|---|---|
| | Al(R)$_3$ | H$_3$PO$_4$ | P(N(n-Bu)$_2$)$_3$ | | |
| 1 | R=n-Pr 0.333 | 0.167 | 0.0333 | 86.4 | 5.04 |
| 2 (comparison) | R=n-Pr 0.333 | 0.167 | 0 | 30.1 | 1.64 |
| 3 | R=n-Bu 0.333 | 0.167 | 0.0333 | 100 | 6.21 |
| 4 (comparison) | R=n-Bu 0.333 | 0.167 | 0 | 37.9 | 1.92 |
| 5 | R=n-Hex 0.333 | 0.167 | 0.0333 | 80.0 | 5.81 |
| 6 (comparison) | R=n-Hex 0.333 | 0.167 | 0 | 43.1 | 2.15 |

[1] The viscosity was measured in the same manner as in Example 1.

EXAMPLE 4

Polymerization of epichlorohydrin was carried out according to the procedure of Example 1 using two types of catalysts, one comprising 1.0 millimole of diisobutyl aluminum monochloride, 0.3 millimole of orthophosphoric acid and 0.1 millimole of tris(diethylamino)phosphine, and the other comprising 1.0 millimole of diisopropyl aluminum monoisopropoxide, 0.3 millimole of orthophosphoric acid and 0.1 millimole of tris(di-n-propylamino)phosphine. The yield of polymer reached 100% by the use of either one of the above catalysts.

EXAMPLE 5

Polymerization of epichlorohydrin was carried out according to the procedure of Example 1 except that the concentration of the triisobutyl aluminum was varied. The results are shown in Table 4 in comparison with the comparative experiment.

As is apparent from Table 4, the effect of $$P(N(n-Bu)_2)_3$$

becomes greater when changing the concentration of Al(i-Bu)$_3$ at the constant ratio of $$H_3PO_4/Al(i-Bu)_3 = 0.33$$

(molar ratio).

EXAMPLE 6

Polymerization of epichlorohydrin was carried out according to the procedure of Example 1 except that tris(diethylamino) arsine and tris(diethylamino)stibine was used instead of tris(diethylamino)phosphine. The yield of the polymer reached 100% in either case.

EXAMPLE 7

A ternary catalyst was prepared by adding, dropwise, 50 ml. of a toluene solution containing 23.6 millimoles of triisobutyl aluminum into a 30 ml. ether solution containing 16.7 millimoles of orthophosphoric acid at −20° C. with vigorous stirring over a period of 30 minutes; then 2.36 millimoles of tris(di-n-butylamino) phosphine was added after the solution had been gradually raised to room temperature. This catalyst solution was then added dropwise over 30 hours into a polymerization vessel fitted with a stirrer which contained 413 g. of epichlorohydrin and 2300 ml. of toluene while maintaining the polymerization temperature at 55° C. The polymerization was terminated by the addition of isopropyl alcohol in an amount equal to ten times the amount of triisobutyl aluminum. After adding thereto one liter of toluene so as to give a viscosity of easy handling, the mixture was poured into 2 liters n-heptane to effect coagulation. After drying, the polymer so obtained was washed with n-heptane which contained about 0.5% of Sumilizer-WX. The polymer was dried for 24 hours at about 60° C. under reduced pressure. The yield of the polymer was 97.0%. The viscosity ($\eta$ sp./° C.) of this polymer measured in α-chloronaphthalene containing 3% acetyl acetone at a concentration of 0.1 g./100 ml. at 100° C. was 2.64.

This polymer was then kneaded at 80° C. with a plastograph according to the composition shown in Table 5, thereafter pressed at 155° C. for 45 minutes. A rubbery material having the physical properties as shown in Table 6 was obtained.

TABLE 5

| | Parts by weight |
|---|---|
| Rubber | 100 |
| HAF Black | 50 |
| White Lead (basic lead carbonate) | 5 |
| Antigen-D | 1 |
| Hexamethylenediamine carbamate | 0.75 |

TABLE 4

| No. | Catalyst (millimole) | | | Yield (percent) | Viscosity [1] ($\eta$ sp./c.) | Crystallinity (percent) |
|---|---|---|---|---|---|---|
| | Al(i-Bu)$_3$ | H$_3$PO$_4$ | P(N(n-Bu)$_2$)$_3$ | | | |
| 1 | 0.167 | 0.050 | 0.0167 | 80 | 6.9 | 0 |
| 2 (comparison) | 0.666 | 0.200 | 0 | 89 | 3.8 | 18 |

[1] The viscosity was measured in the same manner as in Example 1.

TABLE 6

| | |
|---|---|
| Tensile strength (kg./cm.$^2$) | 170 |
| Elongation (percent) | 404 |
| M 300 (kg./cm.$^2$) | 139 |
| Hardness | 76 |

EXAMPLE 8

A ternary catalyst was prepared under the same conditions as described in Example 1 using 0.333 millimole of triisobutyl aluminum, 0.167 millimole of orthophosphoric acid and 0.0333 millimole of tris(di-n-butylamino) phosphine. Using this catalyst, the homopolymerization of ethylene oxide, the homopolymerization of propylene oxide, the copolymerization of ethylene oxide with epichlorohydrin and the copolymerization of propylene oxide with allyl glycidyl ether were carried out. The reaction conditions and the yield of the polymers or copolymers are shown in Table 7.

TABLE 7

| No. | Monomer charged (g.)[1] | | | Solvent of polymerization | Amount (ml.) | Polymerization temperature (°C.) | Polymerization time (hr.) | Yield (percent) | Viscosity[2] ($\eta$ sp./° C.) |
|---|---|---|---|---|---|---|---|---|---|
| | PO | AGE | EO | | | | | | |
| 1 | 3.29 | 0 | 0 | Toluene | 12 | 50 | 3.5 | 80 | 2.0 |
| 2 | 3.29 | 0.2 | 0 | ....do.... | 12 | 50 | 3.5 | 78 | 1.9 |
| 3 | 0 | 0 | 3.84 | ....do.... | 12 | 50 | 3.5 | 89 | 1.6 |
| 4 | 0 | 0 | 3.84 | n-Heptane | 12 | 27 | 5.0 | 86 | 2.3 |

[1] PO: propylene oxide; AGE: allyl glycidyl ether; EO: ethylene oxide; ECH: epichlorohydrin.
[2] The viscosity was measured in benzene at a concentration of 0.1 g./100 ml. at 25° C.

EXAMPLE 9

Various types of monomers were polymerized according to the procedure of Example 1 except that the ternary catalyst used consisted of 7 millimoles of triisobutyl aluminum, 1.4 millimoles of orthophosphoric acid and 0.7 millimole of tris(di-n-butylamino)phosphine and a 300 ml. capped cider bottle was used. The results are shown in Table 8.

TABLE 8

| No. | Monomer charged (g.)[1] | | | | | Yield (percent) | Viscosity[2] ($\eta$ sp./° C.) |
|---|---|---|---|---|---|---|---|
| | ECH | EO | PO | AGE | GMA | | |
| 1 | 34 | 16 | 0 | 0 | 0 | 100 | 6.1 |
| 2 | 6.5 | 0 | 47 | 0 | 0 | 79 | 3.5 |
| 3 | 7.6 | 18.1 | 19.1 | 0 | 0 | 85 | 3.3 |
| 4 | 31 | 15 | 0 | 4 | 0 | 98 | 3.0 |
| 5 | 31 | 15 | 0 | 0 | 4 | 61 | ([3]) |
| 6 | 47 | 0 | 0 | 0 | 4 | 54 | ([3]) |

[1] ECH: epichlorohydrin; EO: ethylene oxide; PO: propylene oxide; AGE: allyl glycidyl ether; GMA: glycidyl methacrylate.
[2] The viscosity was determined in the same manner as in Example 7.
[3] Partly gelated.

EXAMPLE 10

Copolymerization of 14.6 g. of epichlorohydrin with 6.87 g. of ethylene oxide was carried out according to the procedure of Example 1. The results are shown in Table 9 in comparison with the comparative experiment.

TABLE 9

| No. | Catalyst (millimole) | | | Yield (percent) | Viscosity[1] ($\eta$ sp./° C.) |
|---|---|---|---|---|---|
| | Al(i-Bu)$_3$ | H$_3$PO$_4$ | P(N(n-Bu)$_2$)$_3$ | | |
| 1 | 2.95 | 0.59 | 0.30 | 100 | 3.80 |
| 2[2] | 2.95 | 0.59 | 0 | 15 | 0.70 |

[1] The viscosity was measured in the same manner as in Example 7.
[2] Comparison.

EXAMPLE 11

According to the procedure of Example 7, the copolymerization of 590 g. of epichlorohydrin with 34 g. of allyl glycidyl ether was carried out in 4 liters of toluene using a 5 liter-polymerization vessel and a catalyst comprising 50 milimoles of triisobutyl aluminum, 25 millimoles of orthophosphoric acid and 5 millimoles of tris(n-butylamino)phosphine. A copolymer containing 5.7 mole percent allyl glycidyl ether having a viscosity of 1.9 ($\eta$ sp./° C.—measured in the same manner as in Example 7) was obtained in a yield of 87%. Vulcanization of this polymer according to a standard method gave a polymer having a tensile strength of 211 kg./cm.$^2$.

What is claimed is:

1. A method for preparing mono-oxirane compound homopolymers or copolymers, which comprises polymerizing at least one mono-oxirane compound in the presence of a ternary catalyst system comprising:

an organo-aluminum compound represented by the formula AlR$_{3-n}$X$_n$, wherein R is an alkyl group n is an integer of from 0 to 1 and X is a member selected from the group consisting of halogen and alkoxide groups;

an orthophosphoric acid, and a compound represented by the formula (M(NR$_2'$)$_3$, wherein M is a member selected from the group consisting of phosphorus, arsenic and antimony, and R' is an alkyl group.

2. A method according to claim 1, wherein the mono-oxirane compound is ethylene oxide, propylene oxide, 1,2-epoxybutane, 2,3-epoxybutane, epichlorohydrin, epibromohydrin, cyclohexene oxide, allyl, glycidyl ether, butadiene monoxide, or styrene oxide, or mixtures thereof.

3. A method according to claim 1, wherein the organo-aluminum is a member selected from the group consisting of triethyl aluminum, tri-n-propyl aluminum, tri-n-butyl aluminum, triisobutyl aluminum, tri-n-hexyl aluminum, triisohexyl aluminum, diethyl isobutyl aluminum, diisobutyl aluminum monochloride, monoethyl monoisobutyl aluminum monochloride, diisopropyl aluminum monoisopropoxide and mixtures thereof.

4. A method according to claim 1, wherein the orthophosphoric acid is of the formula P(O)(OH)$_3$.

5. A method according to claim 1, wherein the compound represented by the formula M(NR$_2'$)$_3$ is a member selected from the group consisting of tris(diethylamino) phosphine, tris(di-n-propylamino) phosphine, tris(di-n-butylamino) phosphine, tris(di-n-hexylamino) phosphine, tris(diethylamino) arsine, and tris(diethylamino) stibine.

6. A method according to claim 1, wherein the organoaluminum compound is present in an amount within the range of from 0.01 to 10 mole percent, based on the moles of alkylene oxide.

7. A method according to claim 1, wherein the polymerization is carried out at a temperature within the range of from −78° to 200° C.

8. A method according to claim 1, wherein the polymerization is carried out in the presence of an inert solvent.

9. A method according to claim 8, wherein the solvent is a member selected from the group consisting of benzene, toluene, n-hexane, n-heptane, cyclohexane, Decalin, diethyl ether, di-n-propyl ether, tetrahydrofuran, dioxane, chlorobenzene and methylene chloride.

References Cited

UNITED STATES PATENTS 3,221,059   11/1965   Fukui et al. ......... 260—615
3,244,646   4/1966   Naro et al. ........... 260—2

WILLIAM H. SHORT, Primary Examiner

E. A. NIELSEN, Assistant Examiner

U.S. Cl. X.R.

252—431 B; 260—88.3 A, 615 B